United States Patent [19]

Bailey

[11] 3,742,976
[45] July 3, 1973

[54] VALVES
[75] Inventor: Stuart L. Bailey, Houston, Tex.
[73] Assignee: G. W. Murphy Industries, Inc., Houston, Tex.
[22] Filed: Nov. 9, 1971
[21] Appl. No.: 197,066

[52] U.S. Cl........ 137/516.29, 137/516.11, 251/332, 251/333
[51] Int. Cl........................................F16k 15/06
[58] Field of Search.................. 137/516.11, 516.29; 251/334, 357, 332, 333, 334, 357

[56] References Cited
UNITED STATES PATENTS
| | | | |
|---|---|---|---|
| 3,202,178 | 8/1965 | Wolfe | 137/516.29 |
| 2,900,999 | 8/1959 | Courtot | 251/334 |
| 1,786,596 | 12/1930 | Bissel | 251/357 |
| 494,402 | 3/1893 | Walsh | 251/357 |

Primary Examiner—Robert G. Nilson
Assistant Examiner—Edward Look
Attorney—C. M. Kucera

[57] ABSTRACT

A pump valve including a seat ring having a conically tapered seat and a valve closure member having a unitary, circular disc adapted to carry an elastomeric seal ring in a groove in the disc periphery to engage the seat. The groove having upper and lower surfaces to fit and to support the seal ring and to key it to the valve disc. The outer periphery of the seal ring may have a double taper to cushion the sealing operation and to provide longer life for the valve.

7 Claims, 4 Drawing Figures

VALVES

FIELD OF THE INVENTION

This invention relates to valves and more particularly to valves for slush pumps such as are used in connection with oil well drilling.

THE PRIOR ART

In slush pump valves, continuing problems are to reduce the weight of the valve closure and to provide adequate retention and support for the valve seal ring.

SUMMARY OF THE INVENTION

This invention is concerned with reducing the weight and number of parts of slush pump valve closures and with providing adequate support and retention for a seal ring by providing a unitary valve disc having a seal ring groove contoured to key the seal ring to the disc.

BRIEF DESCRIPTION OF THE DRAWINGS

FIG. 3 is a vertical section through a portion of a valve closure showing another embodiment of the invention.

DESCRIPTION OF THE PREFERRED EMBODIMENTS

Figure 1:
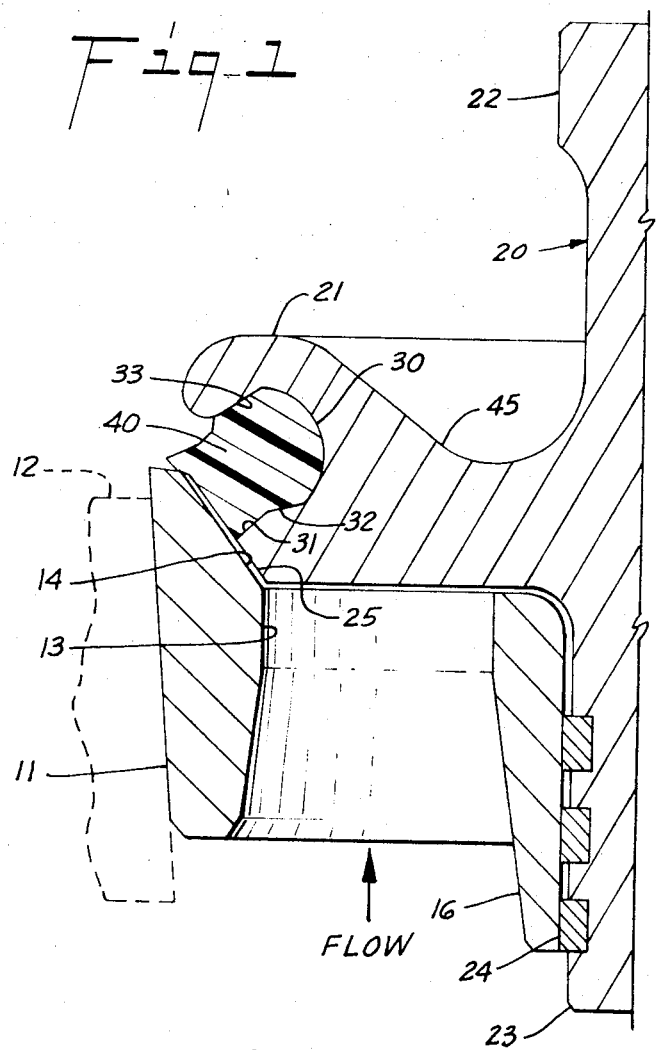
FIG. 1 is a vertical axial section through the valve of the invention showing the parts in the position existing when the seal ring is just in contact with the seat, only the left hand half of the valve being shown.
Figure 2:
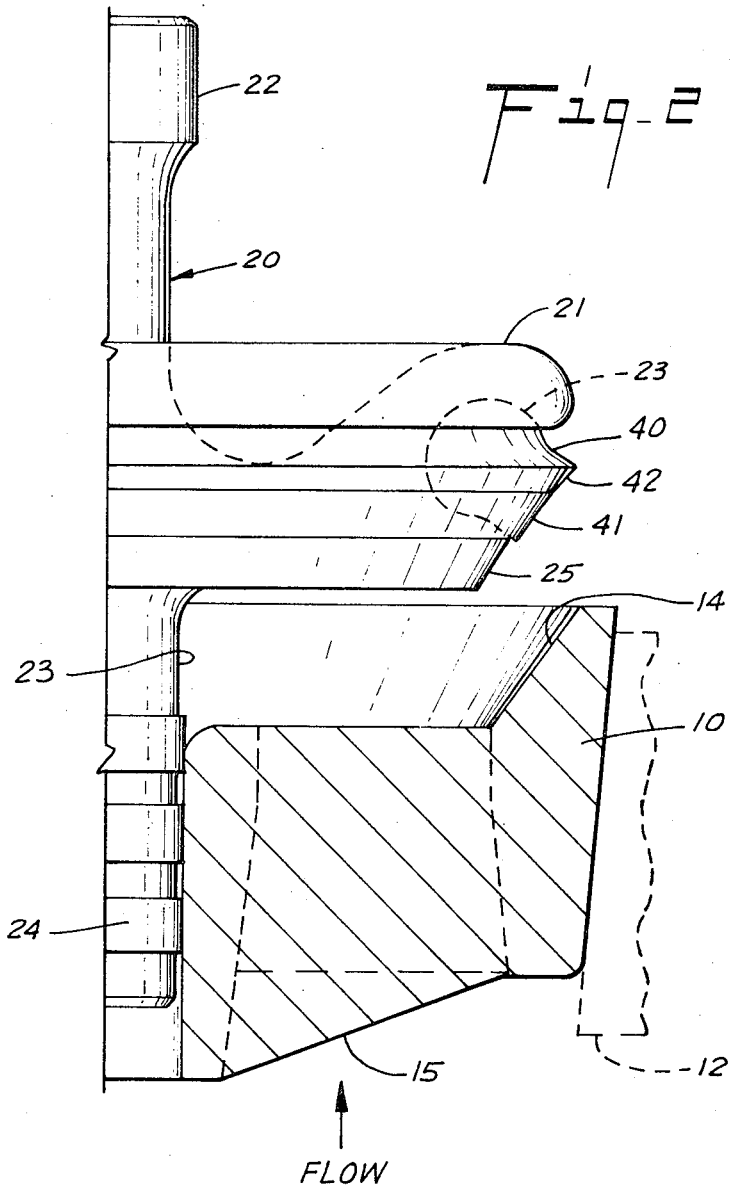
FIG. 2 is a side elevation view, partly in section, showing the valve in open position, only the right hand half of the valve being shown.

Referring to FIGS. 1 and 2, there is shown a steel seat ring 10 having a tapered outer surface 11 adapted to be received in a slush pump valve deck, a portion of which is shown at 12. A portion 13 of the seat ring 10 is generally cylindrical and defines a flow passage through the ring. The seat ring 10 has a conically tapered seal surface 14 and a plurality of webs 15 forming a spider supporting a lower valve stem guide 16.

A valve closure member 20 includes a steel unitary disc 21 having an upper guide stem 22 and a lower guide stem 23 formed integrally therewith. The lower guide stem is provided with a plurality of elastomeric wear rings 24 disposed in annular grooves around the stem. These wear rings engage the inner surface of the valve guide 16 within which the guide stem may reciprocate.

The upper guide stem 22 is adapted to reciprocate in a guide bearing in a valve pot cover (not shown) and a compression spring (not shown) may be disposed concentrically with the upper stem 22 to urge the valve closure 20 to its closed position.

The valve disc 21 has a lower, conically tapered sealing portion 25 cooperable with the seat seal surface 14 to form a seal therewith.

The disc 21 has an annular rounded-bottom groove 30 in its periphery just above the tapered portion 25. A lower surface 31 of the groove extends substantially normally inwardly of the periphery of the disc 21 and an intermediate surface 32 in the groove extends inwardly from the lower surface 31 at a greater angle than said lower surface, relative to the axis of the valve closure member, to merge into the rounded bottom of the groove 30. An upper surface 33 of the groove extends inwardly of the disc substantially parallel to the lower surface 31 to merge into the rounded bottom of the groove 30.

A seal ring 40 which may be made from polyurethane or other suitable elastomeric material is stretched and snapped into groove 30. The portion of the seal ring 40 which fits into the groove 30 has a cross-sectional shape and size that will fit snugly into the groove when the seal ring 40 is installed therein.

The seal ring outer periphery has a lower conically tapered sealing surface 41 adapted to sealingly engage the tapered surface 14 of the seat ring 10. The seal ring outer periphery also includes an upper conically tapered sealing surface 42 above said lower surface. The upper sealing surface 42 has a greater taper angle relative to the axis of the valve member than that of the lower surface 41.

When the valve closure 20 closes, the sealing surface 42 contacts the seat ring 10 first and deforms gradually to conform to the seat ring taper 14 as the valve moves farther down into the seat ring 10 to its fully closed position. This causes a gradual reduction of valve velocity as it closes and tends to alleviate valve damage from sudden impacts with the seat ring.

The valve disc 21 is also contoured as shown at 45 to reduce the weight of the valve closure which results in less severe impacting of the seat ring 10 by the valve closure 20.

Referring to FIG. 3, a portion of a valve disc 50 is shown having an outer periphery having a lower sealing surface 51. The disc also has an annular, rounded-bottom groove 52 therein above the surface 51. A lower surface 53 extends inwardly of the disc to merge into the rounded bottom of the groove. An upper surface 54 extends inwardly of the disc substantially parallel to the lower surface 53 to merge into the rounded bottom of the groove. A seal ring 55 which is similar to seal ring 30 is installed in groove 52.

The substantially straight line surfaces 31, 32 and 33 of FIGS. 1 and 2, and the surfaces 53 and 54 of FIG. 3 provide an interlock to key the seal ring to the valve disc to prevent rolling or twisting of the seal ring and to properly position and support the seal ring in the valve disc groove.

As previously indicated, the cross-sectional size of the seal ring is slightly larger than the corresponding size of the groove cavity into which it fits so that it substantially fills the groove and fits tightly therein.

Referring again to FIGS. 1 and 2, the lower surface 31 of the groove 30 extends substantially normally to the surface 25 of the valve disc thus also extending substantially normally to the plane of the surface 14 of the seat ring 10. This provides for adequate disc material surface area just below surface 31 to confront seat ring taper 14 to alleviate distortion and chipping of these surfaces. Also, the seal ring 40 completely overlies the surface 31 so that there is no gap therebetween so that a large area of the seal ring is available to make sealing contact with the seat ring.

Figure 4:
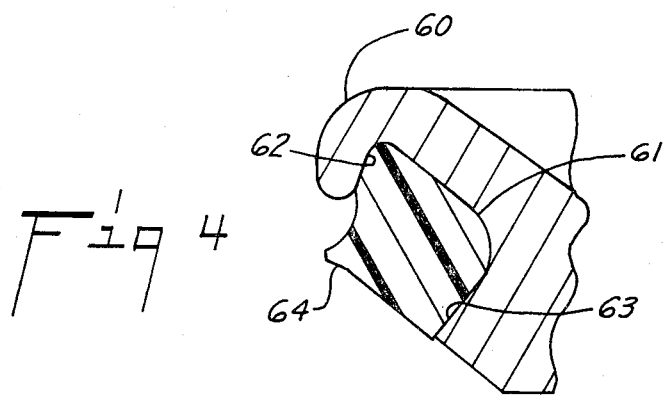
FIG. 4 is a vertical section through a portion of a valve closure showing still another embodiment of the invention.

Referring to FIG. 4, a valve disc 60 has an annular groove 61 in its periphery. An upper surface 62 and a lower surface 63 extend inwardly to merge into the bottom of the groove 61. The upper surface 62 extends inwardly of the disc periphery at a greater angle than lower surface 63. In other words, the surfaces 62 and 63 diverge as they extend inwardly of the periphery of the disc 60. A seal ring 64 which may be made from a suitable elastomeric material is stretched and seated into the groove 61. The portion of the seal ring 64 which fits into groove 61 has a cross-sectional size and shape that will fit tightly in the groove when installed. Thus when the seal ring 64 is in place, the diverging surfaces 62 and 63 key the ring 64 to the disc 60 to prevent the seal ring from turning within the groove or becoming otherwise dislodged from the disc 60 during pumping operations. The outer periphery of the seal ring 64 may have a double taper similar to that previously described.

While preferred embodiments of the invention have been shown and described, various modifications within the scope of the following claims may be made without departing from the spirit of the invention.

What is claimed is:

1. In a valve including a seat ring having a conically tapered seat and a valve member having a circular disc adapted to carry a seal ring in its periphery to engage said seat,
    the periphery of said disc having a lower, conically tapered sealing portion cooperable with said tapered seat,
    the disc having an annular, rounded-bottom groove therein extending around its periphery above said lower tapered sealing portion,
    a lower surface of the groove extending inwardly of the disc,
    an upper surface of the groove extending inwardly of the disc to merge into the rounded bottom of said groove,
    an intermediate surface in said groove extending inwardly from said lower surface at a greater angle than said lower surface, relative to the axis of the valve member, to merge into said rounded bottom,
    the seal ring being made of an elastomeric material having a cross-sectional shape to conform substantially with and to fit snugly within said groove,
    the seal ring outer periphery having a lower, conically tapered sealing surface adapted to engage the correspondingly tapered seat ring,
    the seal ring outer periphery also including an upper conically tapered sealing surface above said lower surface, said upper sealing surface having a greater taper angle, relative to the axis of the valve member, than that of the lower sealing surface.

2. In a valve according to claim 1 wherein the lower surface of the disc groove extends inwardly of the disc substantially normal to the lower, conically tapered portion.

3. In a valve according to claim 1 wherein the upper surface of the disc groove extends substantially parallel to the lower surface of the disc groove.

4. A valve closure comprising:
    a valve member having a circular disc,
    the periphery of said disc having a lower sealing surface,
    the disc also having an annular, rounded-bottom groove therein extending around its periphery above said lower sealing surface,
    a lower surface of the groove extending inwardly of the disc,
    an upper surface of the groove extending inwardly of the disc substantially parallel to the lower surface of the groove to merge into the rounded bottom of the groove,
    an intermediate surface in said groove extending inwardly from said lower surface at a greater angle than said lower surface, relative to the axis of the valve member, to merge into the rounded bottom,
    an elastomeric seal ring in said groove,
    the seal ring having a cross-sectional shape to conform substantially with and to fit tightly within said groove.

5. A valve closure according to claim 4 wherein the seal ring outer periphery has a lower, conically tapered sealing surface and an upper, conically tapered sealing surface having a greater taper angle, relative to the axis of the valve member, than that of the lower sealing surface.

6. A valve closure according to claim 4 wherein the lower sealing surface of the disc is conically tapered.

7. A valve closure according to claim 4 wherein the lower surface of the disc groove extends substantially normal to said lower sealing surface.

* * * * *